United States Patent
Bellwood et al.

(10) Patent No.: US 7,057,640 B2
(45) Date of Patent: Jun. 6, 2006

(54) METHOD AND APPARATUS FOR DYNAMIC BURNOUT IMPRINTING PROTECTION WITH SHIFT CORRECTION

(75) Inventors: Thomas Alexander Bellwood, Austin, TX (US); Leugim A. Bustelo, Austin, TX (US); Julio Eloy Ruano, Austin, TX (US); Matthew Francis Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/317,989

(22) Filed: Dec. 12, 2002

(65) Prior Publication Data

US 2004/0114040 A1    Jun. 17, 2004

(51) Int. Cl.
*H04N 3/20* (2006.01)
*H04N 5/46* (2006.01)

(52) U.S. Cl. ............... 348/173; 348/558; 348/744; 348/556; 348/913

(58) Field of Classification Search ............. 348/173, 348/913, 558, 467, 805, 445, 556, 380, 744, 348/511, 704, 739; 315/370, 380, 381; 345/618, 345/628; H04N 3/20, 5/68, 5/46
See application file for complete search history.

(56) References Cited

U.S. PATENT DOCUMENTS

| 4,589,739 | A | 5/1986 | Goodman .................... 350/452 |
| 4,931,786 | A | 6/1990 | Selby, III .................... 340/755 |
| 5,313,137 | A | 5/1994 | Wittey ........................ 313/478 |
| 5,671,076 | A | 9/1997 | Matsubara et al. ......... 359/196 |
| 6,226,046 | B1 * | 5/2001 | Yamagata et al. .......... 348/558 |
| 6,486,900 | B1 * | 11/2002 | Shen et al. .................. 348/173 |

FOREIGN PATENT DOCUMENTS

EP    0434241 A1    6/1991

* cited by examiner

*Primary Examiner*—Sherrie Hsia
(74) *Attorney, Agent, or Firm*—Duke W. Yee; Jeffrey S. LaBaw; Francis Lammes

(57) ABSTRACT

The present invention provides improved burnout imprinting prevention by slowly moving the position of screen content to ensure that no one area of the guns is unused for a long period of time. Optical and/or mechanical elements are provided to redirect the projected image to the center of the screen. As the image moves on the projection guns the optical elements are positioned accordingly to shift the projected image such that the viewable image is fixed.

29 Claims, 5 Drawing Sheets

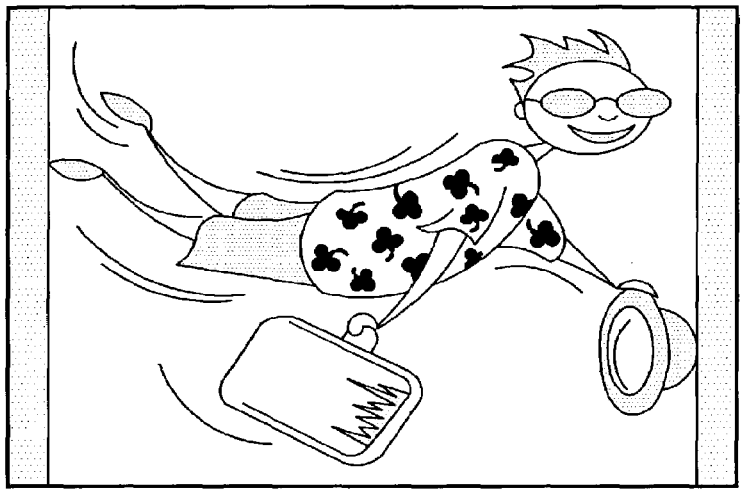
FIG. 2B
FIG. 3A
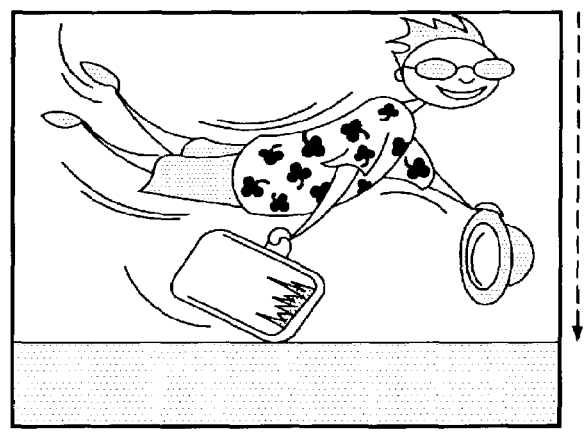
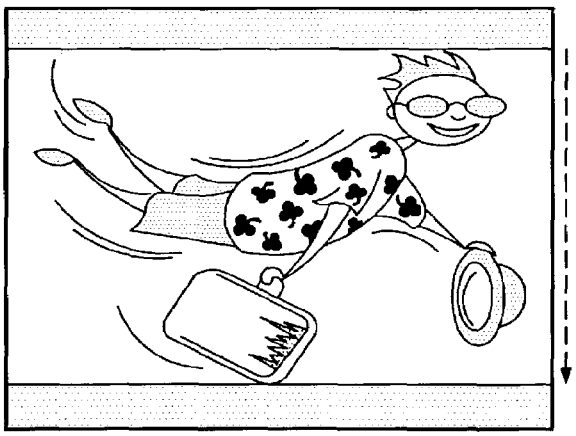
FIG. 3B

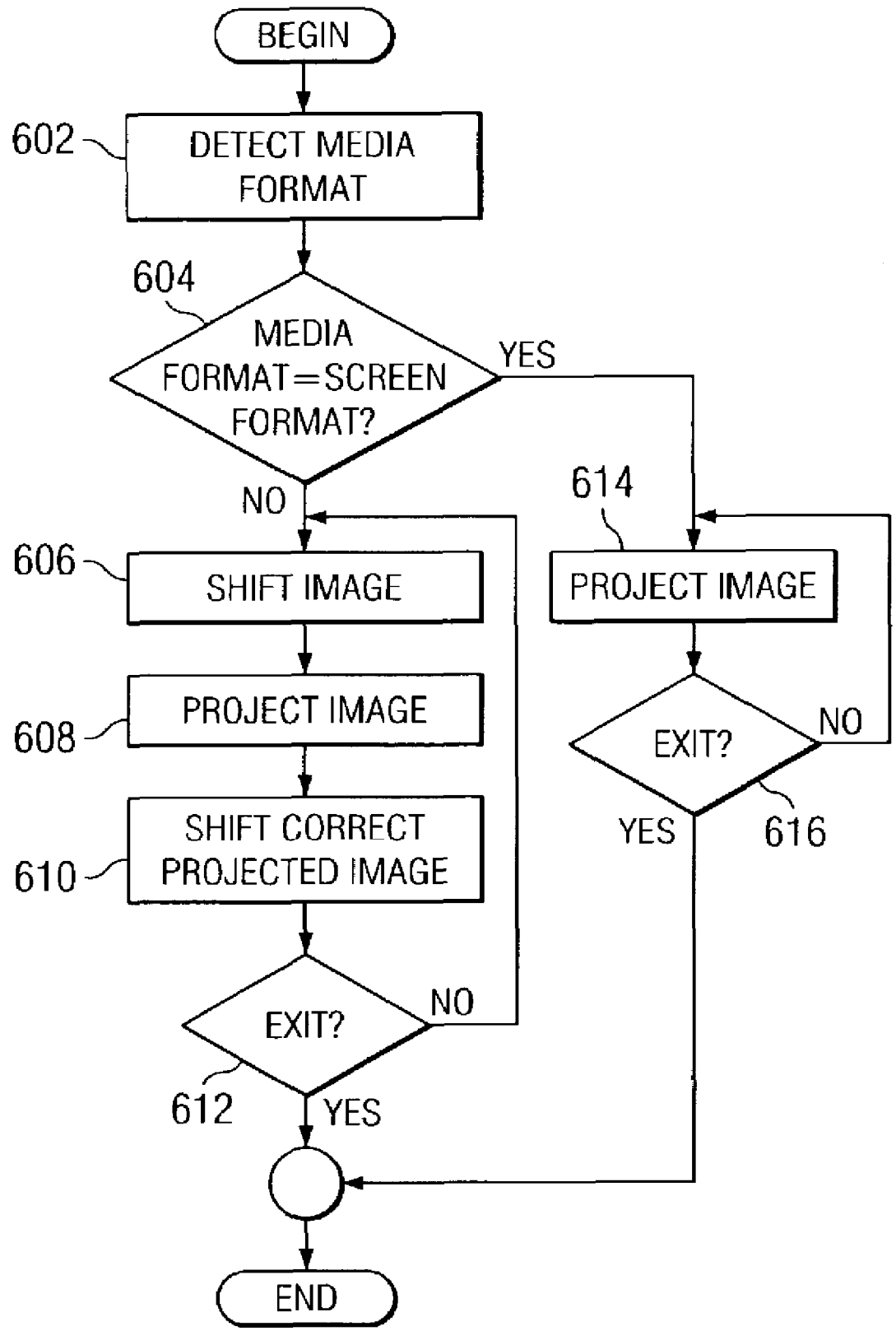

METHOD AND APPARATUS FOR DYNAMIC BURNOUT IMPRINTING PROTECTION WITH SHIFT CORRECTION

BACKGROUND OF THE INVENTION

1. Technical Field

The present invention relates to projection televisions and, in particular, to burnout imprinting protection. Still more particularly, the present invention provides a method and apparatus for dynamic burnout imprinting protection with shift correction.

2. Description of Related Art

Televisions are available in two popular screen formats. The standard format has a 4:3 aspect ratio, meaning the screen is four units wide and 3 units high. In contrast, the common widescreen format has a 16:9 aspect ratio, which is wider than the standard format. Due to the two common aspect ratios, visual media is also typically available in standard or widescreen format.

However, many times visual media is only available in one format. If the screen aspect ratio does not match the media format, the content is displayed on a portion of the screen. Typically, the remainder of the screen is filled in with a solid color, such as black. Black is a special color. In some projectors, such as cathode ray tubes, black means that nothing is being projected in that area. In other projectors, black is a projection composed of multiple colors which simulate black. Thus, for example, a widescreen format presentation displayed on a standard screen may have black bars on the top and bottom of the screen. Conversely, a standard format presentation displayed on a widescreen format television may have black bars on the left and right sides of the screen.

Due to the length of time a non-matching media is displayed on a screen, the screen may experience burnout imprinting. In most cases, burnout imprinting results in the area that is blacked out being noticeably brighter than the remainder of the screen real estate. In other cases, burnout imprinting results in the area that is blacked out being noticeably darker. In the case of a cathode ray tube (CRT) television, burnout imprinting affects the tube. Projection televisions typically have three guns: red, green, and blue. These guns then project the image onto a screen. In most cases, the screen material is not susceptible to imprint burning. With projection televisions, burnout imprinting is likely to affect the projection guns and, to a lesser extent, the projector lenses.

Therefore, it would be advantageous to provide improved burnout imprinting protection on projection televisions.

SUMMARY OF THE INVENTION

The present invention provides improved burnout imprinting prevention by allowing full-range movement variation of the projected image across the entire unused screen real estate without degrading the user experience. The projected image is slowly moved on the guns to ensure that no one area is unused for a long period of time. Optical elements are provided to dynamically adjust the position of the projected image that reaches the screen to keep the image stationary and to compensate for any and all protective movements performed by the projector guns.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A and 2B illustrate examples of typical television screens displaying incompatible media formats;

FIGS. 3A–3F illustrate example screen burnout compensation at the projection lenses through image movement across all available screen real estate in accordance with a preferred embodiment of the present invention;

FIG. 6 is a flowchart illustrating the operation of a burnout imprinting protection mechanism with shift correction in accordance with a preferred embodiment of the present invention.

DETAILED DESCRIPTION OF THE PREFERRED EMBODIMENT

Figure 1A:
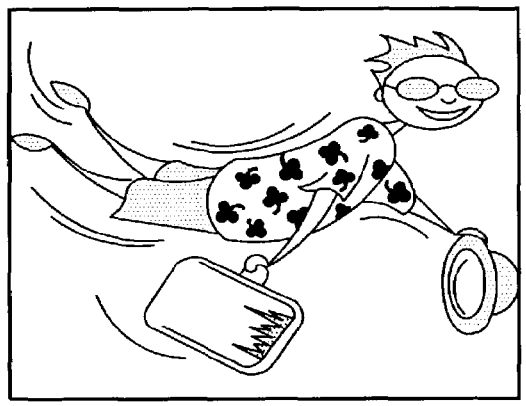
FIGS. 1A and 1B illustrate examples of typical television screen formats.
Figure 1B:
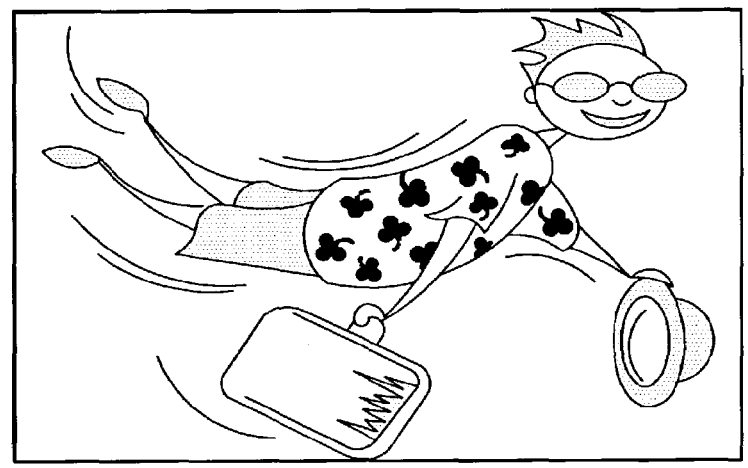

With reference now to the drawings, FIGS. 1A and 1B illustrate examples of typical television screen formats. More particularly, FIG. 1A depicts a standard format screen with a 4:3 aspect ratio. FIG. 1B depicts a widescreen format with a 16:9 aspect ratio.

Many times visual media is only available in one format. If the screen aspect ratio does not match the media format, the content is displayed on a portion of the screen. Typically, the remainder of the screen is filled in with a solid color, such as black.

Figure 2A:
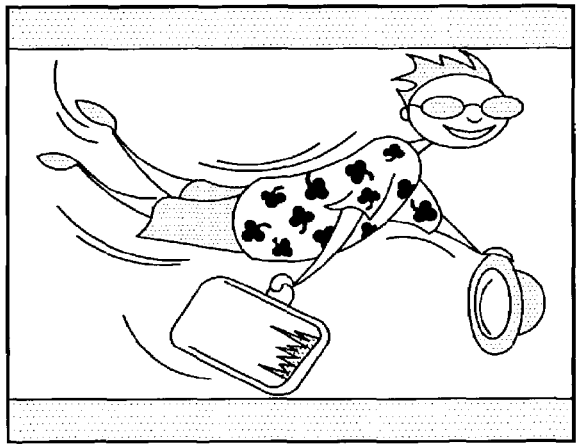

FIGS. 2A and 2B illustrate examples of typical television screens displaying incompatible media formats, illustrating no image shifting for burnout protection. For example, FIG. 2A depicts a widescreen format presentation displayed on a standard screen. The media content is displayed in the center of the screen and black bars appear in the unused screen real estate on the top and bottom of the screen. FIG. 2B depicts a standard format presentation displayed on a widescreen format television. The media content is displayed in the center of the screen and black bars appear in the unused screen real estate on the left and right sides of the screen.

Turning now to FIGS. 3A–3F, example screen burnout compensation at the projection lenses through image movement across all available screen real estate in accordance with a preferred embodiment of the present invention. If the media format is not compatible with the screen aspect ratio, an image shifter is used to slowly shift the image to ensure that no one area of the guns is unused for a long period of time.

Figure 3C:
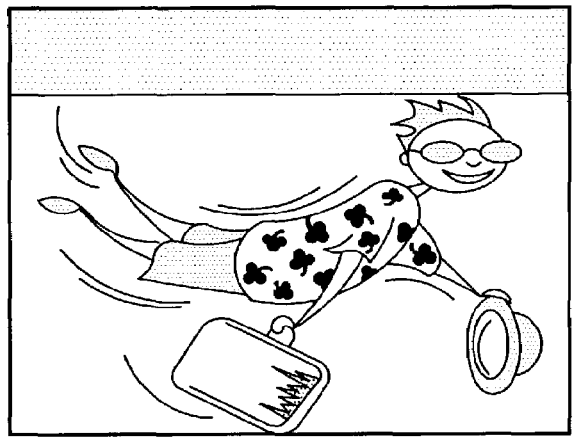
Figure 3D:
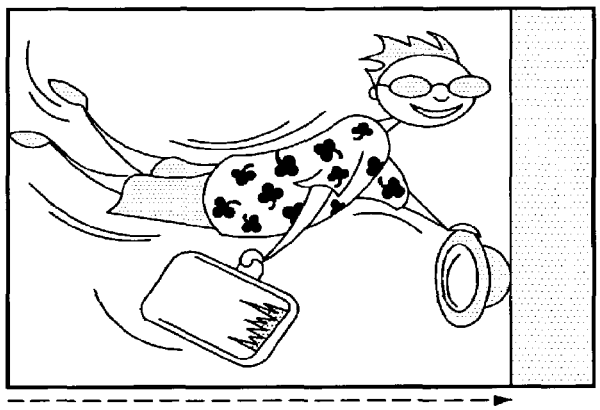
Figure 3E:
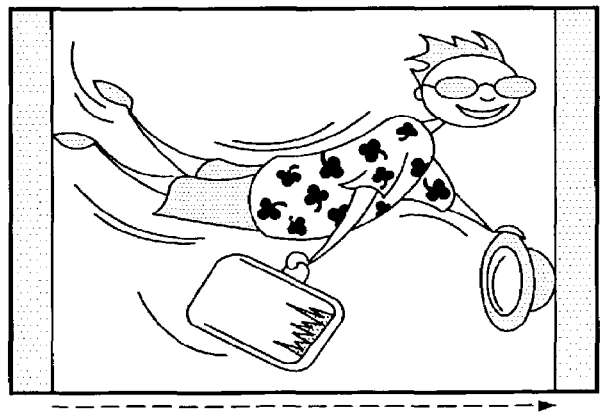
Figure 3F:
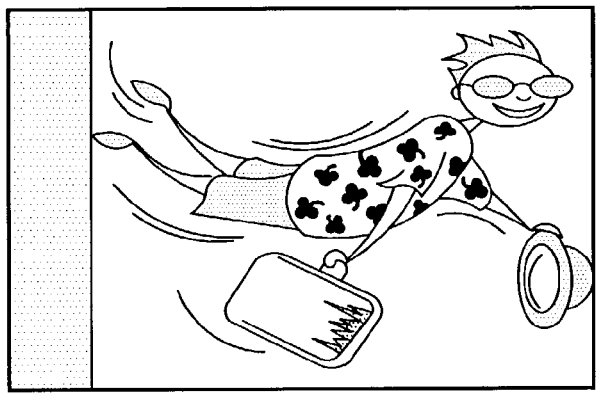

As shown in FIGS. 3A–3C, a widescreen format image is projected using standard format guns, starting at the top of the screen. The image is then slowly shifted up and down. Similarly, as shown in FIGS. 3D–3F, a standard format image is projected from widescreen format guns, starting at the left side of the screen. The image is then slowly shifted right and left.

The image is shifted slowly so that the viewer may not notice the image movement. When such image shifts are allowed to reach the screen, viewers may find such movements to be an annoyance, particularly if a high degree of burnout protection is being achieved through shifts across the entire unused screen real estate. Many people invest large sums of money into home theater equipment, and optimal viewing experience is key to the home theater market. While image shifting may protect against burnout imprinting, or at least greatly delay its noticeable effects, the technique may still detract from an otherwise enjoyable viewing experience.

In accordance with a preferred embodiment of the present invention, optical elements are provided to redirect the projected image to the center of the screen. As the image moves on the projection guns the optical elements are positioned accordingly to shift the projected image such that the viewable image is fixed. In a multigun system, if a burnout projection mechanism is applied to the system, the burnout projection mechanism must be applied on all of the guns.

Figure 4:
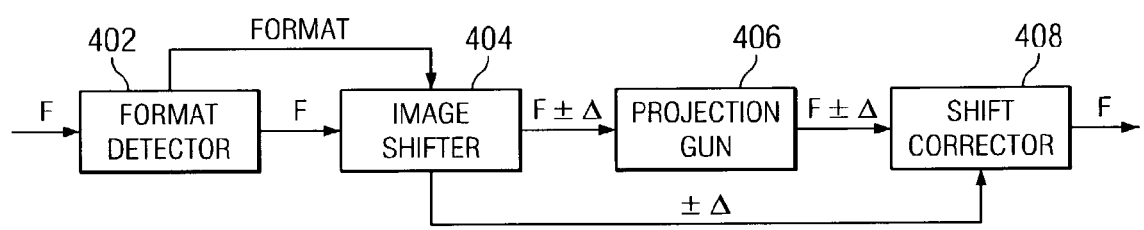
FIG. 4 is a block diagram depicting a burnout imprinting protection mechanism with shift correction in accordance with a preferred embodiment of the present invention.

With reference to FIG. 4, a block diagram is shown depicting a burnout imprinting protection mechanism with shift correction in accordance with a preferred embodiment of the present invention. Format detector 402 receives media (F) and detects the format of the media. The format detector provides the media to image shifter 404 along with the identified media format. The format detector may be as simple as an optical mask sensing the form of the projected output, or may be manually set by the user based upon the media to be displayed.

Responsive to the media format being different from the screen format, image shifter 404 presents the media image offset by an offset value (Δ). Projection gun 406 receives the shifted image (F±Δ) and projects the image. The offset value is adjusted through time to slowly shift the image up and down or left and right, depending on the media and screen formats.

Projection gun 406 project the entire image or, in a preferred embodiment, the projection gun may project the image in one of the colors of white light: red, green, and blue. For example, projection gun 406 may be the red gun and image shifter 404 may shift the red image. Thus, a burnout imprinting protection mechanism may be provided for each projection gun. However, while some projectors separate the projection mechanism into separate red/green/blue guns, others combine the colors with one projection gun. The present invention is applicable to both cases. Shift corrector 408 receives the projected image and the offset value. The shift correction then redirects the shifted image based on the offset value, which results in the original media (F).

In a multigun system, if a burnout projection mechanism is applied to the system, the burnout projection mechanism must be applied on all of the guns. Thus, it follows that shift correction is also applied to all of the projected composite images.

Figure 5A:
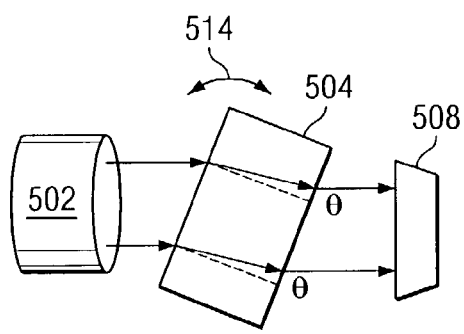
FIGS. 5A and 5B are block diagrams of example shift correction mechanisms in accordance with a preferred embodiment of the present invention.
Figure 5B:
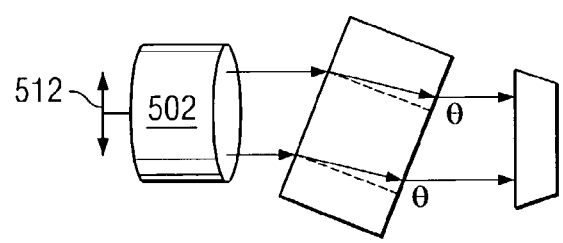

With reference now to FIGS. 5A and 5B, block diagrams of example shift correction mechanisms are shown in accordance with a preferred embodiment of the present invention. More particularly, FIG. 5A illustrates a refractive shift correction mechanism. Projection gun 502 projects a shifted image, such as a shifted red, green, or blue image. Optical element 504 is positioned using actuator 514. Optical element 504 refracts light from projection gun 502 by the angle θ within the refractive material. Rays of light entering the material at a given angle of incidence therefore undergo a parallel shift upon exit. The amount of linear shift is dictated by the thickness of the material, the angle of incidence and the type of material, which determines its index of refraction according to Snell's law. Optical element 504 can be dynamically rotated to alter the angle of incidence of the projector's light on the refractive media. Actuator 514 is preferably a motor, such as a stepper motor, to provide controlled, accurate rotation or movement of optical element 504.

The material of the optical element may vary. More dense materials cause increased refraction. Glass is a an example material that may be used in a preferred embodiment.

As shown in FIG. 5A, the light from the projection gun is shift corrected and is projected onto screen 508. The placement of the light onto the screen depends on the angle of incidence, which can be adjusted dynamically to control the resulting amount by which the image is shifted. In the case of a widescreen format image projected onto a standard format screen, the image is refracted in the vertical direction. Conversely, in the case of a standard format image projected onto a widescreen format television screen, the image is refracted in the horizontal direction.

FIG. 5B illustrates an alternative example of a refractive shift correction mechanism. Rather than using an actuator to dynamically adjust the optical element, the optical element may be fixed and projection gun 502 may be moved using actuator 512. The actuator may be, for example, a rack and pinion style mechanism that would allow the guns themselves to be dynamically moved back and forth or up and down to compensate for the equivalent movement of the image on the surface of the gun. Also, movement of the guns will be with respect to a housing (not shown), thus offsetting the movement of the image on the guns. Actuator 512 is preferably a motor, such as a stepper motor, to provide controlled, accurate movement of projection gun 502.

In the example shown in FIG. 5B, the shift correction may be accomplished without the need for the optical element. Therefore, in an alternative embodiment, the optical element may be removed and the guns may be slowly moved with respect to the housing to offset the movement of the image on the guns.

Turning to FIG. 6, a flowchart is shown illustrating the operation of a burnout imprinting protection mechanism with shift correction in accordance with a preferred embodiment of the present invention. The process begins and detects the media format (step 602) of the media (F). A determination is made as to whether the media format is the same as the screen format (step 604).

If the media format is not compatible with the screen format, the process shifts the image (step 606) by an offset value (Δ), projects the shifted image (F±Δ) (step 608), and shift corrects the projected image (step 610) based on the offset value.

In the case of a rotatable optical element, such as a lens, shown in FIG. 5A, an angle of rotation is calculated to shift correct the image. Given the offset value, the dimensions of the lens, and the corresponding angle of refraction (θ) determined using Snell's law, this angle of rotation is calculated to result in the appropriate amount of shift correction to offset the value Δ. In the case of a moveable projector gun, as shown in FIG. 5B, the projector gun may be moved to offset the real-life distance the image is shifted on the gun itself.

Next, a determination is made as to whether an exit condition exists (step 612). An exit condition may exist, for example, when the television is powered off or when the media is no longer displayed. As an example, an exit condition may exist when a digital video disk (DVD) is stopped or ejected. If an exit condition does not exist, the process returns to step 606 to shift the media image. If, however, an exit condition does exist in step 612, the process ends.

Returning to step 604, if the media format is compatible with the screen format, the process projects the image 614. A determination is made as to whether an exit condition exists (step 616). If an exit condition does not exist, the process returns to step 614 to project the image from the media. If, however, an exit condition does exist in step 616, the process ends.

Thus, the present invention solves the disadvantages of the prior art by providing burnout imprinting prevention by slowly moving the position of screen content and by providing a shift correction mechanism to redirect the projected image to the center of the screen. The shift correction mechanism includes one or more optical and/or mechanical elements for redirecting the projected image. As the image moves on the projection guns the optical and/or mechanical elements are positioned accordingly to shift the projected image such that the viewable image is fixed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for displaying an image on a screen with dynamic burnout imprinting protection, wherein the screen has a screen format, the method comprising:
   detecting a media format of the image;
   responsive to the media format being different from the screen format, shifting the image by an offset value to form a shifted image;
   projecting the shifted image; and
   redirecting the shifted image based on the offset value, wherein the step of redirecting the shifted image includes refracting the shifted image through an optical element.

2. The method of claim 1, wherein the screen format is standard format and the media format is widescreen format.

3. The method of claim 1, wherein the screen format is widescreen format and the media format is standard format.

4. The method of claim 1, further comprising:
   adjusting the offset value through time.

5. The method of claim 4, wherein the step of adjusting the offset value through time includes adjusting the offset value so that complete projection lens real estate is used to maximize burnout imprinting protection.

6. The method of claim 1, wherein the image is a one of a plurality of composite images and the shifted image is a shifted composite image.

7. The method of claim 1, further comprising:
   adjusting the optical element through time based on the offset value.

8. A method for displaying an image on a screen with dynamic burnout imprinting protection, wherein the screen has a screen format, the method comprising:
   detecting a media format of the image;
   responsive to the media format being different from the screen format, shifting the image by an offset value to form a shifted image;
   projecting the shifted image; and
   redirecting the shifted image based on the offset value, wherein the step of projecting the shifted image includes projecting the shifted image using at least one projection gun and wherein the step of redirecting the shifted image includes moving the at least one projection gun.

9. The method of claim 8, wherein the screen format is standard format and the media format is widescreen format.

10. The method of claim 8, wherein the screen format is widescreen format and the media format is standard format.

11. The method of claim 8, further comprising:
    adjusting the offset value through time.

12. The method of claim 11, wherein the step of adjusting the offset value through time includes adjusting the offset value so that complete projection lens real estate is used to maximize burnout imprinting protection.

13. The method of claim 8, wherein the image is a one of a plurality of composite images and the shifted image is a shifted composite image.

14. An apparatus for dynamic burnout imprinting protection, the apparatus comprising:
    a screen having a screen format;
    a format detector, wherein the format detector receives a media image and detects a media format of the media image;
    an image shifter, wherein the image shifter receives the media image and the media format and, responsive to the media format being different from the screen format, shifting the media image by an offset value to form a shifted image;
    a projection gun that projects the shifted image to form a projected image; and
    a shift corrector, wherein the shift corrector redirects the shifted image based on the offset value, wherein the shift corrector includes an optical element.

15. The apparatus of claim 14, wherein the format detector detects the media format using an optical mask.

16. The apparatus of claim 14, wherein the screen format is standard format and the media format is widescreen format.

17. The apparatus of claim 14, wherein the screen format is widescreen format and the media format is standard format.

18. The apparatus of claim 14, wherein the image shifter adjusts the offset value through time.

19. The apparatus of claim 18, wherein the image shifter adjusts the offset value so that complete projection lens real estate is used to maximize burnout imprinting protection.

20. The apparatus of claim 14, wherein the image is a one of a plurality of composite images and the shifted image is a shifted composite image.

21. The apparatus of claim 14, wherein the shift corrector includes an actuator for moving the optical element based on the offset value.

22. The apparatus of claim 14, wherein the optical element is a refractive medium.

23. An apparatus for dynamic burnout imprinting protection, the apparatus comprising:
   a screen having a screen format;
   a format detector, wherein the format detector receives a media image and detects a media format of the media image;
   an image shifter, wherein the image shifter receives the media image and the media format and, responsive to the media format being different from the screen format, shifting the media image by an offset value to form a shifted image;
   a projection gun that projects the shifted image to form a projected image; and
   a shift corrector, wherein the shift corrector redirects the shifted image based on the offset value, wherein the shift corrector includes an actuator for moving the projection gun based on the offset value.

24. The apparatus of claim 23, wherein the format detector detects the media format using an optical mask.

25. The apparatus of claim 23, wherein the screen format is standard format and the media format is widescreen format.

26. The apparatus of claim 23, wherein the screen format is widescreen format and the media format is standard format.

27. The apparatus of claim 23, wherein the image shifter adjusts the offset value through time.

28. The apparatus of claim 27, wherein the image shifter adjusts the offset value so that complete projection lens real estate is used to maximize burnout imprinting protection.

29. The apparatus of claim 23, wherein the image is a one of a plurality of composite images and the shifted image is a shifted composite image.

* * * * *